United States Patent [19]
Vliegen et al.

[11] Patent Number: 5,277,882
[45] Date of Patent: Jan. 11, 1994

[54] PROCESS FOR RECOVERING GERMANIUM

[75] Inventors: Jean H. Vliegen, Lichtaart; Guy G. Haesebroek, Mortsel; Achille J. De Schepper, Lichtaart, all of Belgium

[73] Assignee: Union Miniere s.a., Marcinelle, Belgium

[21] Appl. No.: 752,542

[22] PCT Filed: Apr. 11, 1990

[86] PCT No.: PCT/BE90/00016
§ 371 Date: Sep. 25, 1991
§ 102(e) Date: Sep. 25, 1991

[87] PCT Pub. No.: WO90/13677
PCT Pub. Date: Nov. 15, 1990

[51] Int. Cl.⁵ .............................................. C01G 17/00
[52] U.S. Cl. ........................................ 423/89; 423/98
[58] Field of Search .............. 423/89, 92, 95, 98, 423/111, 112, 122, 131, 128, DIG.

[56] References Cited

U.S. PATENT DOCUMENTS

| | | | |
|---|---|---|---|
| Re. 33,410 | 10/1990 | De Schepper et al. | 423/89 |
| 3,883,634 | 5/1975 | De Schepper et al. | 423/89 |
| 4,432,951 | 2/1984 | De Schepper et al. | 423/89 |
| 4,432,952 | 2/1984 | De Schepper et al. | 423/89 |
| 4,525,332 | 6/1985 | Boateng et al. | 423/89 |
| 4,568,526 | 2/1986 | Rouillard nee Bauer et al. | 423/89 |
| 4,666,686 | 5/1987 | Krajewski et al. | 423/89 |
| 4,886,648 | 12/1989 | Menendez et al. | 423/92 |
| 4,915,919 | 4/1990 | Boateng et al. | 423/89 |
| 4,942,023 | 7/1990 | De Schepper et al. | 423/22 |

FOREIGN PATENT DOCUMENTS

| | | |
|---|---|---|
| 0068540 | 1/1983 | European Pat. Off. . |
| 0068541 | 1/1983 | European Pat. Off. . |
| 0167414 | 1/1986 | European Pat. Off. . |
| 0313201 | 4/1989 | European Pat. Off. . |
| 0324963 | 7/1989 | European Pat. Off. . |
| 1168510 | 7/1985 | U.S.S.R. . |

Primary Examiner—David Brunsman
Attorney, Agent, or Firm—Lowe, Price, LeBlanc & Becker

[57] ABSTRACT

A germanium bearing sulphate solution containing indium and/or gallium is brought at pH 1-2.5 into contact with an organic phase, containing a substituted 8-hydroxyquinoline and an acid organophosphorus compound. So, in addition to germanium, indium and gallium are also extracted from the sulphate solution.

26 Claims, 4 Drawing Sheets

PROCESS FOR RECOVERING GERMANIUM

The present invention relates to a process for separating germanium from a germanium-bearing aqueous sulphate solution, according to which said solution is brought into contact with an organic phase, containing a substituted 8-hydroxyquinoline and an organophosphorus compound, said contact being operated at a pH at which the organic phase is loaded with germanium.

Such a process is described in EP-A-199905. In this known process one starts for instance form a sulphate solution with 220 mg Ge/l, 110 g Zn/l and 32 g $H_2SO_4$/l, originating from flue dust leaching. This solution is brought into contact at 35° C. with an organic phase, containing a mixture of substituted 8-hydroxyquinolines as well as tri-n-octylphosphinoxide (TOPO), for instance a solution composed of 15% in volume of a hydroxyquinoline mixture, 0.1 mol TOPO, 40% in volume of isodecanol and, for the remaining, kerosene; the hydroxyquinoline mixture itself is composed of 10% in volume of "Kelex 100" and 90% in volume of "LIX 26", Kelex 100 and LIX 26 being trade names for extracting agents containing one or more substituted 8-hydroxyquinolines as active component. At the low pH that sets up when the acid starting solution (32 g $H_2SO_4$/l) is brought into contact with the organic phase, the largest part of the germanium is transferred from the starting solution into the organic phase from which germanium is recovered afterwards by treatment with a NaOH solution.

This known process is especially directed to the recovery of germanium from solutions originating as an intermediate product or a by-product in the extractive metallurgy of metals such as Al, Pb, Cu and Zn. However, these solutions can contain, besides Ge, also In and/or Ga, particularly when solutions from the zinc metallurgy are concerned. To treat solutions containing besides Ge, also In and/or Ga, this known process is less suited in that sense that it does not enable to transfer in one an the same operation Ge, In and Ga into the organic phase.

The aim of the present invention is to provide a process such as defined herebefore enabling, when the germanium-bearing aqueous sulphate solution contains In and/or Ga, to transfer in one and the same operation these elements into the organic phase, together with germanium.

This invention is based on the discovery that a mixture of a substituted 8-hydroxyquinoline and an organophosphorus compound containing at least one phosphorus-bearing acid function, exhibits a strong synergy for the extraction of Ge as well as of In and Ga from a weak acid sulphate medium.

The process according to the invention is characterized in that one used an indium and/or gallium containing germanium-bearing aqueous sulphate solution as said germanium-bearing aqueous sulphate solution, one uses a compound containing at least one phosphorus-bearing acid function as said organophosphorus compound and one operates said contact at a pH of 0.5-2.5 in the presence of indium and gallium as well as in the absence of gallium and at a pH of 0.5-4 in the absence of indium, whereby the organic phase loads itself with indium and/or gallium too.

Operating said contact at a given pH, e.g. at pH 2, means here that the acidity of the aqueous solution and/or of the organic phase before and/or during their contact is adjusted in such a way that the aqueous solution has a pH of 2 at the moment the contact between both phases will be interrupted, which normally happens when the chemical equilibrium between both phases is reached or almost reached.

When the germanium-bearing starting solution contains both indium and gallium, it is necessary to operate said contact at a pH of 0.5-2.5; if one operates at a pH lower than 0.5, then indium and gallium are insufficiently extracted and at a pH exceeding 2.5 indium precipitates; one operates preferably at pH 1-2.5 and most preferably at pH 1-2, for example at pH 1.5-1.7. When the germanium-bearing starting solution contains indium but no gallium, it is also necessary to operate said contact at a pH of 0.5-2.5, since indium is insufficiently extracted at a pH lower than 0.5 and it precipitates at a pH exceeding 2.5; one operates preferably at pH 1-2 and most preferably at pH 1.2-1.7.

When the germanium-bearing starting solution contains gallium but no indium, it is necessary to operate said contact at a pH of 0.5-4; gallium is insufficiently extracted at a pH lower than 0.5, as mentioned before, and at a pH exceeding 4 gallium precipitates; one operates preferably at pH 1-4 and most preferably at pH 1-2.5, for example at pH 1.5-2.

It is self-evident that, when the germanium-bearing starting solution contains both indium and gallium and one is, for whatsoever reason, not interested in the recovery of one of these metals e.g. gallium, one shall operate said contact at a pH which is optimum for the recovery of the other metal, e.g. indium.

The process of the invention is particularly useful for treating germanium-bearing solutions contains In and-/or Ga and which contain, apart from water, zinc sulphate as main constituent. Such solutions occur frequency as an intermediate product or as a byproduct in the zinc metallurgy, more particularly in the electrowinning of zinc.

Any substituted 8-hydroxyquinoline described or referred to in the European patent application EP-A-0324963 can be used.

One uses preferably a quinoline from the group of quinolines with the general formula wherein n ranges between 5 and 15.

A typical representative of this group is 7-(1-methyl-4-ethyl)-octyl-8-hydroxyquinoline, which is the active component of an extractant commercialized by Schering AG under the trade name "Kelex 100".

As an organophosphorus compound containing at least one phosphorus-bearing acid function, one can use any compound from the group of compounds with the general formula wherein R₁ is an alkyl-, alkenyl-, aryl- or alkylaryl radical or an alicyclic radical with 1 to 20, preferably 5 to 15, carbon atoms, R₂ is hydrogen or an alkyl-, alkenyl-, aryl-, alkylaryl radical or and alicyclic radical with 1 to 20, preferably 5 to 15, carbon atoms, and A and B, that can be identical or different, represent an oxygen- or sulphur atom.

Typical representatives of this group are di-(2-ethyl)-hexyl-phosphoric acid (D2EHPA or DEHPA), tridecyl phosphoric acid, mono-(2-ethyl)-hexyl-(2-ethyl)-hexyl-phosphonic acid-ester (sold under the trade name PC-88 A), mono-(2-ethyl)-hexyl-benzyl-phosphonic acid (EHBPA), bis(2,4,4-trimethyl)-pentyl-phosphinic acid (sold under the trade name Cyanex 272), di-(2-ethyl)-hexyl-dithiophosphoric acid, di-(2-ethyl)-hexyl-thiophosphoric acid, bis-(2,4,4-trimethyl)-pentyl-dithiophosphinic acid (sold under the trade name Cyanex 301) and bis-(2,4,4-trimethyl)-pentyl-monothiophosphinic acid (sold under the trade name Cyanex 302).

One uses preferably a phosphonic acid such as e.g. PC-88 A, since a phosphinic acid such as e.g. Cyanex 272 is less efficient when extracting Ga and In and since a phosphoric acid such as, e.g. D2EHPA can raise difficulties when processing the loaded organic phase, particularly when the latter contains iron; indeed, it has been found that it is hard to elute iron from an organic phase that contains D2EHPA (when there is iron in the starting solution, part of it comes into the organic phase together with Ge, In and/or Ga).

The ratio between the volume of quinoline and the volume of phosphorus compound that is used, ranges preferably from 1:10 to 10:1 and most preferably from 1:2 to 2:1.

One can use a liquid organic phase and then apply the liquid-liquid extraction technique.

Normally said liquid organic phase has an inert solvent as main component. The inert solvent can have a strongly marked aliphatic character as well as a strongly marked aromatic character; it can have a mixed aliphatic-aromatic character too.

Said liquid organic phase contains preferably a modifier too, i.e. an agent that, on the one hand, prevents the formation of an emulsion and, on the other hand, increases the solubility of the metal complexes, that are formed, in the solvent and thereby avoids the formation of a third phase. The modifier can be a heavy alcohol (for instance isodecanol), a heavy phenol (for instance nonylphenol), tributylphosphate, TOPO or a sulphoxide.

When making use of a liquid organic phase, the technique of the emulsified liquid membrane can also be applied; this technique is also called LSM- or ELM technique (LSM=Liquid Surfactant Membrane and ELM=Emulsified Liquid Membranes).

One can also use an organic phase that contains a solid carrier, by which the quinoline and the organophosphorus compound (or a solution thereof) are carried.

If the solid carrier is a porous membrane, the organic phase shall of course be brought into contact with the starting solution according to the SLM-technique (SLM=Supported Liquid Membrane). If the solid carrier is a resin, the organic phase shall of course be used like the traditional ion exchange resins were used till now. The quinoline and the acid phosphorus compound can be adsorbed on the resin, but they can also be embedded in it, for instance according to the method described in DE-A-2162951.

One can also use an organic phase containing several substituted 8-hydroxyquinolines and/or acid phosphorus compounds.

It is possible to operate said contact at ambient temperature, but it is more advantageous to operate at a temperature above 40° C., since the extraction equilibrium is then faster reached and since this equilibrium is more favourable too. Thus, the temperature has a favourable effect on the kinetics as well as on the thermodynamics of the extraction reaction. From an economical point of view, it is however senseless to operate at 80° C. or higher.

Germanium can be eluted from the loaded organic phase by bringing the latter into contact with a NaOH solution, the pH of which is higher than 12, preferably a solution with at least 10 g/l NaOH and particularly a solution with at least 50 g/l NaOH. One can for instance operate as described in EP-B-46437, EP-B-68541, EP-B-167414 or EP-A-199905.

Indium can be eluted from the loaded organic phase by bringing the latter into contact either with a H₂SO₄ solution with more than 50 g/l H₂SO₄, preferably a solution with more than 100 g/l H₂SO₄, or with a HCl solution with 10-100 g/l HCl, preferably a solution with 20-50 g/l HCl.

Gallium can be eluted from the loaded organic phase by bringing the latter into contact either with a H₂SO₄ solution with more than 100 g/l H₂SO₄, preferably a solution with more than 150 g/l H₂SO₄, or with a HCl solution with 40-100 g/l HCl, preferably a solution with 60-70 g/l HCl.

Indium and gallium can be eluted together from the loaded organic phase by bringing the latter into contact either with a H₂SO₄ solution with more than 100 g/l H₂SO₄, preferably a solution with more than 150 g/l H₂SO₄, or with a HCl solution with 40-70 g/l HCl.

The process of the invention is illustrated by the examples following hereafter. In all these examples the aqueous sulphate solutions are industrial solutions, except in the examples 4 and 5, in which one starts from a synthetic sulphate solution.

EXAMPLE 1

This example shows the synergy between Kelex 100, on the one hand, and either D2EHPA (phosphoric acid), or PC-88 A (phosphonic acid) or Cyanex 272 (phosphinic acid), on the other hand, for the extraction of Ge, In and Ga from a weak acid sulphate medium.

Kelex 100 is, as mentioned before, the trade name of an extracting agent, containing 7-(1-methyl-4-ethyl)-octyl-8-hydroxyquinoline as active constituent, the structural formula of this compound being

D2EHPA is the generally used name of an extracting agent consisting of di-(2-ethyl)-hexyl-phosphoric acid with the structural formula PC-88 A is, as already mentioned, the trade name of an extracting agent consisting of mono-(2-ethyl)-hexyl-(2-ethyl)-hexyl-phosphonic acid-ester, the structural formula of this compound being Cyanex 272 is, as already mentioned, the trade name of an extracting agent consisting of bis (2,4,4-trimethyl)-pentylphosphinic acid, the structural formula thereof being Starting from the beforementioned extracting agents, isodecanol (ID) and Escaid 120 (kerosene), 7 different organic phases (OP) are prepared with the following composition in volume %:

OP1: 7.5 Kelex 100—25 ID—67.5 Escaid 120
OP2: 7.5 D2EHPA—25 ID—67.5 Escaid 120
OP3: 7.5 D2EHPA—7.5 Kelex 100—25 ID—60 Escaid 120
OP4: 7.5 PC-88 A—25 ID—67.5 Escaid 120
OP5: 7.5 PC-88 A—7.5 Kelex 100—25 ID—60 Escaid 120
OP6: 7.5 Cyanex 272—25 ID—67.5 Escaid 120
OP7: 7.5 Cyanex 272—7.5 Kelex 100—25 ID—60 Escaid 120

The sulphate solution to be treated has a pH of 1.35 and contains per liter: 100 g Zn, 0.025 g Ge, 0.280 g In and 0.070 g Ga.

Three volumes of sulphate solution are stirred at 50° C. for 10 minutes with one volume of OP1. One measures the pH of the aqueous phase and one allows the phases to separate. Then the Ge, In and Ga concentration is determined in the aqueous phase ($[Ge]_A$, $[In]_A$ and $[Ga]_A$ in g/l) and in the organic phase ($[Ge]_O$, $[In]_O$ and $[Ga]_O$ in g/l), after which the distribution coefficients ($K_D$) are calculated.

The same test is carried out with the six other organic phases. The results of these tests are given in Table 1.

TABLE 1

| OP nr | Active Compon. | $[Ge]_A$ | $[Ge]_O$ | $K_{DGe}$ | $[In]_A$ | $[In]_O$ | $K_{DIn}$ | $[Ga]_A$ | $[Ga]_O$ | $K_{DGa}$ | pH |
|---|---|---|---|---|---|---|---|---|---|---|---|
| 1 | Kelex 100 | 0.015 | 0.030 | 2.0 | 0.203 | 0.231 | 1.14 | 0.070 | 0 | 0 | 1.32 |
| 2 | D2EHPA | 0.029 | 0 | 0 | 0.040 | 0.720 | 18 | 0.070 | 0 | 0 | 1.28 |
| 3 | D2EHPA + K100 | 0.009 | 0.048 | 5.33 | 0.010 | 0.810 | 81 | 0.060 | 0.030 | 0.5 | 1.26 |
| 4 | PC-88 A | 0.026 | 0 | 0 | 0.064 | 0.648 | 10.1 | 0.060 | 0.030 | 0.5 | 1.31 |
| 5 | PC-88 A + K100 | 0.007 | 0.054 | 7.7 | 0.012 | 0.804 | 67 | 0.050 | 0.060 | 1.20 | 1.27 |
| 6 | CNX 272 | 0.028 | 0 | 0 | 0.240 | 0.160 | 0.67 | 0.070 | 0 | 0 | 1.27 |
| 7 | CNX 272 + K100 | 0.012 | 0.039 | 3.25 | 0.120 | 0.480 | 4.0 | 0.060 | 0.030 | 0.5 | 1.22 |

These results show undeniably a synergic effect between Kelex 100 and each of the phosphor compounds for the extraction of Ge, In and Ga.

Indeed, Ge has a $K_D=2$ when using only Kelex 100 and a $K_D=0$ when using only D2EHPA, PC-88 A or Cyanex 272, but a $K_D=5.33$, 77 and 3.25 when using Kelex 100 with respectively D2EHPA, PC-88 A and Cyanex 272. Indium has a $K_D=1.14$ when using only Kelex 100 and a $K_D=18$, 10 and 0.67 when using respectively D2EHPA, PC-88 A and Cyanex 272 alone, but a $K_D=81$, 67 and 4 when using Kelex 100 with respectively D2EHPA, PC-88 A and Cyanex 272.

Finally, gallium has a $K_D=0$ when using only Kelex 100 and a $K_D=0$, 0.5 and 0 when using respectively D2EHPA, PC-88 A and Cyanex 272 alone, but a $K_D=0.5$, 1.2 and 0.5 when using Kelex 100 with respectively D2EHPA, PC-88 A and Cyanex 272.

EXAMPLE 2

This example shows the synergy between LIX 26 and PC-88 A for the extraction of Ge, In and Ga from a weak acid sulphate medium.

LIX 26 is the trade name of a 7-substituted 8-hydroxyquinoline, which is commercialized by Henkel Corporation and which consists of a mixture of branched alkyl isomers with one or two unsaturations in the alkyl side chain. $C_{11}H_{22}$ and $C_{12}H_{24}$ are the most abundant alkylates of 8-hydroxyquinoline found in LIX 26 (see "A novel solvent extraction system for the refining of precious metals" by G. P. Demopoulos et al. in ISEC '86 International Solvent Extraction Conference—München, 11–16 Sep. 1986, Preprints Vol. II, pp. II-581—II-—588).

The sulphate solution has a pH of 1.35 and contains per liter: 90 g Zn, 0.032 g Ge, 0.370 g Ga and 0.200 g In.

One operates with the following organic phases:
OP1: 7.5 LIX 26—25 ID—67.5 Escaid 120
OP2: 7.5 PC-88 A—25 ID—67.5 Escaid 120
OP3: 7.5 LIX 26—7.5 PC-88 A—25 ID—60 Escaid 120

One proceeds in the same way as in example 1, i.e. extraction in one step with an organic phase/aqueous phase ratio (O/A)=⅓, at 50° C. and with a stirring time of 10 minutes, and the same measurements are made as in example 1.

The results are given in table 2.

TABLE 2

| OP | Active Compon. | [Ge]$_A$ | [Ge]$_O$ | $K_{DGe}$ | [In]$_A$ | [In]$_O$ | $K_{DIn}$ | [Ga]$_A$ | [Ga]$_O$ | $K_{DGa}$ | pH |
|---|---|---|---|---|---|---|---|---|---|---|---|
| 1 | LIX 26 | 0.024 | 0.026 | 1.09 | 0.190 | 0.044 | 0.23 | 0.340 | 0.116 | 0.34 | 1.00 |
| 2 | PC-88 A | 0.032 | 0 | 0 | 0.070 | 0.390 | 5.57 | 0.380 | 0 | 0 | 1.05 |
| 3 | PC-88 A + LIX 26 | 0.015 | 0.051 | 3.43 | 0.030 | 0.510 | 17.00 | 0.300 | 0.210 | 0.70 | 1.10 |

These results show also an undeniable synergic effect between LIX 26 and PC-88 A for the extraction of Ge, In and Ga.

Indeed, Ge has a $K_D = 1.09$ when using only LIX 26 and a $K_D = 0$ when using only PC-88 A, but a $K_D = 3.43$ with a mixture of LIX 26 and PC-88 A.

Indium has a $K_D = 0.23$ when using only LIX 26 and a $K_D = 5.57$ when using only PC-88 A, but a $K_D = 17.00$ with a mixture of LIX 26 and PC-88 A.

Gallium has a $K_D = 0.34$ when using only LIX 26 and a $K_D = 0$ when using only PC-88 A, but a $K_D = 0.70$ with a mixture of LIX 26 and PC-88 A.

EXAMPLE 3

This example shows the synergy between Kelex 100 and EHBPA for the extraction of Ge, In and Ga from a weak acid sulphate medium.

EHBPA is the generally used name of an extracting agent consisting of mono-(2-ethyl)-hexyl-benzyl-phosphonic acid with the structural formula The sulphate solution has a pH of 1.35 and contains per liter: 90 g Zn, 0.032 g Ge, 0.370 g Ga and 0.200 g In.

One operates with the following organic phases:
OP1: 7.5 Kelex 100—25 ID—67.5 Escaid 120
OP2: 7.5 EHBPA—25 ID—67.5 Escaid 120
OP3: 7.5 Kelex 100—7.5 EHBPA—25 ID—60 Escaid 120

One proceeds in the same way as in example 1, i.e. extraction in one step with an organic phase/aqueous phase ratio (O/A) = ⅓, at 50° C. and with a stirring time of 10 minutes, and the same measurements are made as in example 1.

The results are given in table 3.

TABLE 3

| OP | Active Compon. | [Ge]$_A$ | [Ge]$_O$ | $K_{DGe}$ | [In]$_A$ | [In]$_O$ | $K_{DIn}$ | [Ga]$_A$ | [Ga]$_O$ | $K_{DGa}$ | pH |
|---|---|---|---|---|---|---|---|---|---|---|---|
| 1 | KELEX 100 | 0.025 | 0.023 | 0.91 | 0.190 | 0.040 | 0.21 | 0.340 | 0.109 | 0.32 | 1.06 |
| 2 | EHBPA | 0.031 | 0.007 | 0.24 | 0.010 | 0.696 | 69.63 | 0.290 | 0.328 | 1.13 | 0.97 |
| 3 | EHBPA + K 100 | 0.013 | 0.062 | 5.13 | <0.001 | 0.603 | >603 | 0.070 | 0.915 | 13.07 | 0.94 |

These results show also an undeniable synergic effect between Kelex 100 and EHBPA for the extraction of Ge, In and Ga.

Indeed, Ge has a $K_D = 0.91$ when usine only Kelex 100 and a $K_D = 0.24$ when using only EHBPA, but a $K_D = 5.13$ with a mixture of Kelex 100 and EHBPA.

Indium has a $K_D = 0.21$ when using only Kelex 100 and a $K_D = 69.63$ when using only EHBPA, but a $K_D = 603$ with a mixture of Kelex 100 and EHBPA.

Gallium has a $K_D = 0.32$ when using only Kelex 100 and a $K_D = 1.13$ when using only EHBPA, but a $K_D = 13.07$ with a mixture of Kelex 100 and EHBPA.

EXAMPLE 4

This example shows the synergy between Kelex 100 and LIX 26, on the one hand, and PC-88 A, on the other hand, for the extraction of Ge, In and Ga from a weak acid sodium sulphate solution.

The sodium sulphate solution has a pH of 1.35 and contains per liter: 52.9 g Na, 0.109 g Ge, 0.110 g Ga and 0.400 g In.

One operates with the following organic phases:
OP1: 7.5 Kelex 100—25 ID—67.5 Escaid 120
OP2: 7.5 LIX 26—25 ID—67.5 Escaid 120
OP3: 7.5 PC-88 A—25 ID—67.5 Escaid 120
OP4: 7.5 Kelex 100—7.5 PC-88 A—25 ID—60 Escaid 120
OP5: 7.5 LIX 26—7.5 PC-88 A—25 ID—60 Escaid 120

One proceeds in the same way as in example 1, i.e. extraction in one step with an organic phase/aqueous phase ratio (O/A) = ⅓, at 50° C. and with a stirring time of 10 minutes, and the same measurements are made as in example 1.

The results are given in table 4.

TABLE 4

| OP nr | Active Compon. | [Ge]$_A$ | [Ge]$_O$ | $K_{DGe}$ | [In]$_A$ | [In]$_O$ | $K_{DIn}$ | [Ga]$_A$ | [Ga]$_O$ | $K_{DGa}$ | pH |
|---|---|---|---|---|---|---|---|---|---|---|---|
| 1 | Kelex 100 | 0.083 | 0.081 | 0.97 | 0.310 | 0.280 | 0.90 | 0.120 | 0 | 0 | 1.02 |
| 2 | LIX 26 | 0.079 | 0.095 | 1.20 | 0.310 | 0.287 | 0.93 | 0.110 | 0.005 | 0.05 | 1.00 |
| 3 | PC-88 A | 0.109 | 0 | 0 | 0.140 | 0.789 | 5.63 | 0.120 | 0 | 0 | 1.00 |
| 4 | K 100 + PC-88 A | 0.032 | 0.235 | 7.35 | 0.035 | 1.109 | 31.68 | 0.090 | 0.065 | 0.72 | 1.00 |
| 5 | LIX 26 + PC-88 A | 0.013 | 0.292 | 22.45 | 0.020 | 1.154 | 57.69 | 0.080 | 0.095 | 1.18 | 1.01 |

These results show once more an undeniable synergic effect between PC-88 A and both substituted 8-hydroxyquinolines for the extraction of Ge, In and Ga from a weak acid sulphate medium.

Indeed, Ge has a $K_D=0.97$ and 1.20 when using respectively Kelex 100 and LIX 26 alone and a $K_D=0$ when using PC-88 A alone, but a $K_D=7.35$ and 22.45 when using PC-88 A with respectively Kelex 100 and LIX 26.

Indium has a $K_D=0.90$ and 0.93 when using respectively Kelex 100 and LIX 26 alone and a $K_D=5.63$ when using PC-88 A alone, but a $K_D=31.68$ and 57.69 when using PC-88 A with respectively Kelex 100 and LIX 26.

Gallium has a $K_D=0$ and 0.05 when using respectively Kelex 100 and LIX 26 alone and a $K_D=0$ when using PC-88 A alone, but a $K_D=0.72$ and 1.18 when using PC-88 A with respectively Kelex 100 and LIX 26.

EXAMPLE 5

This example shows that the synergy between Kelex 100 and PC-88 A for the extraction of Ge, In and Ga from a weak acid sulphate medium has a thermodynamical character.

The sulphate solution has a pH of 1.35 and contains per liter: 150 g $Na_2SO_4$, 0.097 g Ge, 0.130 g Ga and 0.190 g In.

One operates with the following organic phases:
OP1: 7.5 PC-88 A—25 ID—67.5 Escaid 120
OP2: 7.5 Kelex 100—25 ID—67.5 Escaid 120
OP3: 7.5 PC-88 A—7.5 Kelex 100—25 ID—60 Escaid The sulphate solution is treated with these organic phases in the following conditions: O/A=½; temperature =50° C.; stirring time=120 min. The percentage extracted Ge, Ga and In are determined after 10, 20, 40, 60 and 120 minutes of contact.

Figure 1A:
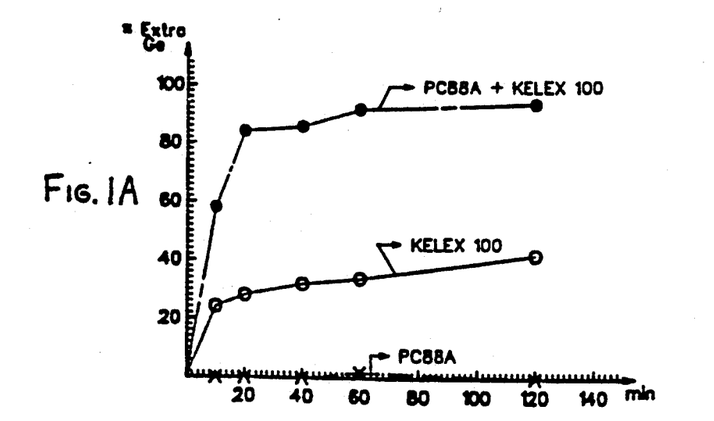
Figure 1B:
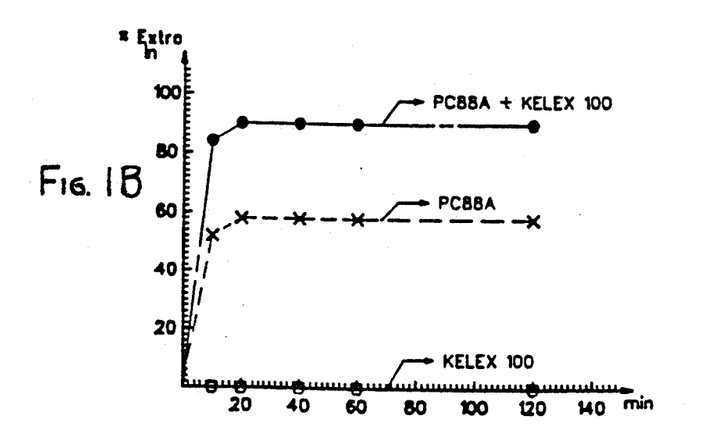
Figure 1C:
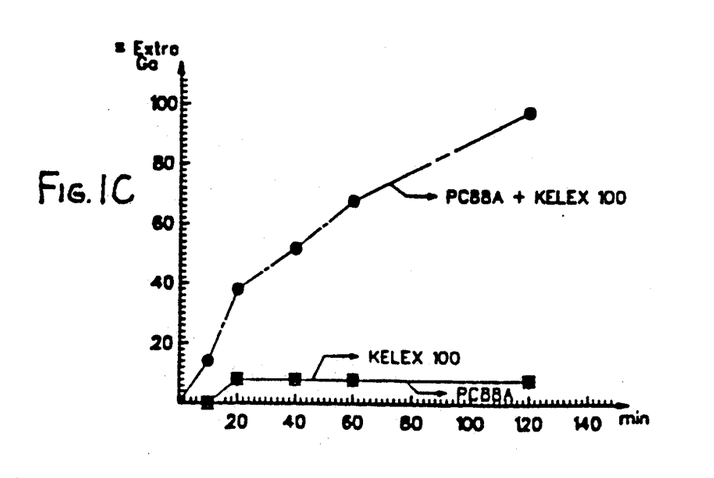

The results of this tests are represented graphically on the diagrams of FIG. 1 with the duration of contact in minutes on the abscissa and the percentage of extraction on the ordinate.

FIGS. 1A, 1B and 1C shows clearly that the synergy has a thermodynamical character. Indeed, the extraction yields obtained at equilibrium with OP3 are clearly higher than the sum of the extraction yields obtained at equilibrium with OP1 and OP2.

EXAMPLE 6

This example relates to the extraction of Ge and In from a sulphate solution according to the process of the invention.

The sulphate solution has a pH of 1.35 and contains per liter; 100 g Zn, 0.75 g Ge and 0.7 g In.

One operates with the following organic phases:
OP1: 5 Kelex 100—5 PC-88 A—25 ID—60 Escaid 120
OP2: 5 Kelex 100—7.5 PC-88 A—25 ID—62.5 Escaid 120
OP3: 5 Kelex 100—10 PC-88 A—25 ID—60 Escaid 120
OP4: 7.5 Kelex 100—10 PC-88 A—25 ID—60 Escaid 120
OP5: 10 Kelex 100—10 PC-88 A—25 ID—55 Escaid 120

One proceeds in the same way as in example 1, i.e. extraction in one step with an organic phase/aqueous phase ratio (O/A)=⅓, at 50° C. and with a stirring time of 10 minutes, and the same measurements are made as in example 1.

The results are given in table 5.

TABLE 5

| OP nr. | % K100 | % PC88A | $[Ge]_A$ | $[Ge]_O$ | $K_{DGe}$ | $[In]_A$ | $[In]_O$ | $K_{DIn}$ | pH |
|---|---|---|---|---|---|---|---|---|---|
| 1 | 5 | 5 | 0.057 | 0.054 | 0.95 | 0.20 | 1.50 | 7.5 | 1.18 |
| 2 | 5 | 7.5 | 0.031 | 0.132 | 4.26 | 0.11 | 1.77 | 16.1 | 1.16 |
| 3 | 5 | 10 | 0.029 | 0.138 | 4.76 | 0.06 | 1.92 | 32.0 | 1.14 |
| 4 | 7.5 | 7.5 | 0.021 | 0.162 | 7.71 | 0.07 | 1.89 | 27.0 | 1.15 |
| 5 | 10 | 10 | 0.016 | 0.177 | 11.06 | 0.02 | 2.04 | 102 | 1.12 |

EXAMPLE 7

This example shows the influence of the pH in the process of the invention.

In a first test a sulphate solution of pH 1.5 and containing 100 g/l Zn, 0.092 g/l Ge, 0.3 g/l In and 0.11 g/l Ga is treated with an organic phase composed of 10% Kelex 100, 5% PC-88 A, 25% ID and 60% Escaid 120.

One operates in 2 steps: in the first step the starting solution is brought into contact with the organic phase and in the second step the aqueous phase, originating from the first step, is treated with fresh organic phase.

Both steps are carried out in the following conditions: O/A=½; temperature=50° C.; stirring time=10 minutes.

In both steps the same measurements are made as in example 1.

In a second and third test one proceeds in the same way as in the first test, but instead of starting with a sulphate solution with a pH of 1.5, one starts now with a solution with a pH of respectively 1.25 and 1.00.

The results of these three tests are given in table 6.

TABLE 6

| Step | $[Ge]_A$ | $[Ge]_O$ | $K_{DGe}$ | $[Ga]_A$ | $[Ga]_O$ | $K_{DGa}$ | $[In]_A$ | $[In]_O$ | $K_{DIn}$ | pH |
|---|---|---|---|---|---|---|---|---|---|---|
| Test 1: pH = 1.5 | | | | | | | | | | |
| 1 | 0.013 | 0.151 | 11.65 | 0.040 | 0.137 | 3.437 | ≦0.010 | 0.552 | ≧55.18 | 1.300 |
| 2 | 0.002 | 0.022 | 11.04 | 0.020 | 0.041 | 2.040 | <0.010 | — | — | 1.240 |
| Test 2: pH = 1.25 | | | | | | | | | | |
| 1 | 0.009 | 0.159 | 17.61 | 0.070 | 0.083 | 1.186 | 0.012 | 0.548 | 45.67 | 1.190 |
| 2 | <0.001 | 0.016 | >16.04 | 0.050 | 0.042 | 0.840 | <0.010 | — | — | 1.160 |
| Test 3: pH = 1.00 | | | | | | | | | | |
| 1 | 0.005 | 0.168 | 33.56 | 0.080 | 0.066 | 0.824 | 0.028 | 0.526 | 18.78 | 0.950 |
| 2 | <0.001 | 0.008 | >8.184 | 0.070 | 0.022 | 0.312 | <0.010 | — | — | 0.950 |

It appears from these results that an increase of pH increases the $K_D$ of In and Ga and decreases the $K_D$ of Ge.

EXAMPLE 8

This examples shows the influence of the duration of contact and the temperature in the process of the invention.

In a first test a sulphate solution with a pH of 1.35 containing 100 g/l Zn, 0.092 g/l Ge and 0.3 g/l In is treated with an organic phase composed of 7.5% Kelex 100, 7.5% PC-88 A, 25ID and 60% Escaid 120 in the following conditions: O/A=$\frac{1}{2}$; temperature=35° C.; stirring time=20 min. The percentages extracted Ge and In are determined after 2, 5, 10 and 20 minutes of contact. In a second test, one proceeds in the same way as in the first test, but instead of operating at 35° C., one operates now at 50° C.

Figure 2:
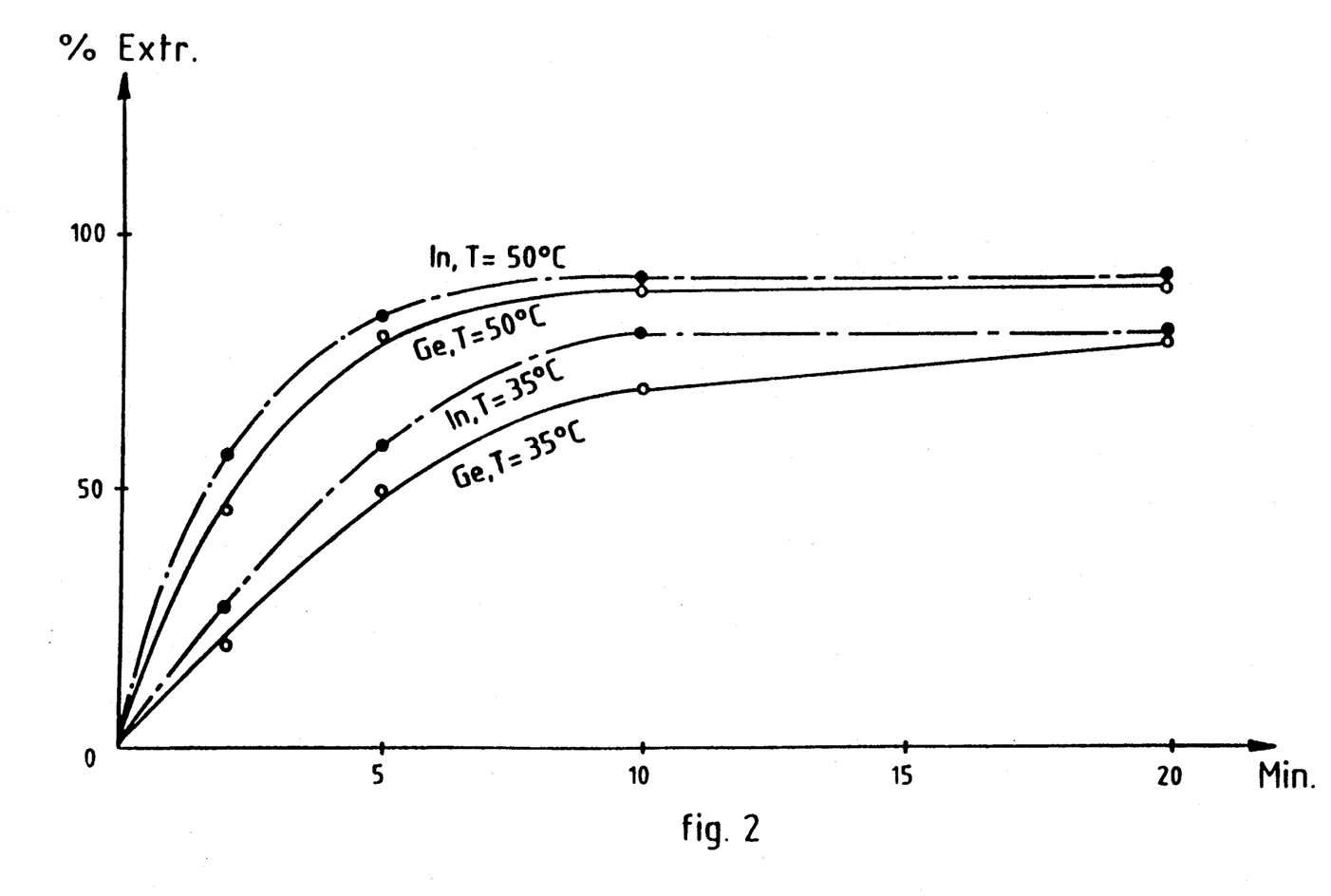

The results of these tests are represented graphically on the diagram of FIG. 2 with the duration of contact in minutes on the abscissa and the percentage of extraction on the ordinate.

FIG. 2 shows that the temperature has a favourable influence on both the kinetics and the thermodynamics of the extraction reactions.

EXAMPLE 9

This example relates to the extraction of Ge, In and Ga from a sulphate solution according to the process of the invention.

The sulphate solution has a pH of 1.5 and contains per liter: 100 g Zn, 0.092 g Ge, 0.3 g In and 0.11 g Ga.

The organic phase is composed of 10% Kelex 100, 5% PC-88 A, 25% ID and 60% Escaid 120.

One operates in 2 steps: in the first step the starting solution is brought into contact with the organic phase and in the second step the aqueous phase, originating form the first step and the pH of which has been brought back to 1.5 by addition of ZnO, is treated with fresh organic phase.

Both steps are carried out in the following conditions: O/A=$\frac{1}{2}$; temperature=50° C.; stirring time=10 minutes.

The results are given in table 7.

TABLE 7

| Step | $[Ge]_A$ | $[Ge]_O$ | $K_{DGe}$ | $[Ga]_A$ | $[Ga]_O$ | $K_{DGa}$ | $[In]_A$ | $[In]_O$ | $K_{DIn}$ | pH |
|---|---|---|---|---|---|---|---|---|---|---|
| 1 | 0.005 | 0.174 | 34.8 | 0.044 | 0.132 | 3.00 | 0.038 | 0.524 | 13.8 | 1.27 |
| 2 | <0.001 | — | — | <0.010 | 0.068 | >6.8 | <0.010 | 0.056 | >5.6 | 1.40 |

It appears from these results that, when carrying out the extraction operation in more steps—which normally happens in liquid-liquid extraction—, it is advantageous to adjust the pH between the extraction steps in order to reach a higher extraction yield for Ga.

EXAMPLE 10

This example relates to the elution of In and Ga from an organic phase obtained by the process of the invention by means of $H_2SO_4$.

The organic phase consists of 10% Kelex 100. 5% PC-88 A, 25% ID and 60% Escaid 120 and contains, in mg/l: 120 Ge, 150 Ga and 660 In.

In a first test this organic phase is treated with an aqueous solution of 52.1 g/l $H_2SO_4$ in the following conditions: O/A=5/1; temperature=35° C.; stirring time=20 minutes. One allows the phases to separate and then one determines the acid concentration of the aqueous phase as well as the $K_D$ of Ge, In and Ga.

This test is repeated with aqueous solutions of 110.6, 263.6 and 552.4 g/l of $H_2SO_4$. The results of these tests are represented graphically in the diagram of FIG. 3, with log $K_D$ on the ordinate and the acid concentration of the separated aqueous phase (in g/l) on the abscissa. The log $K_D$ of Ge is not represented on the diagram; it is much higher than 2 between 50 and 280 g/l $H_2SO_4$ and higher than 1 between 450 and 550 g/l of $H_2SO_4$.

Figure 3:
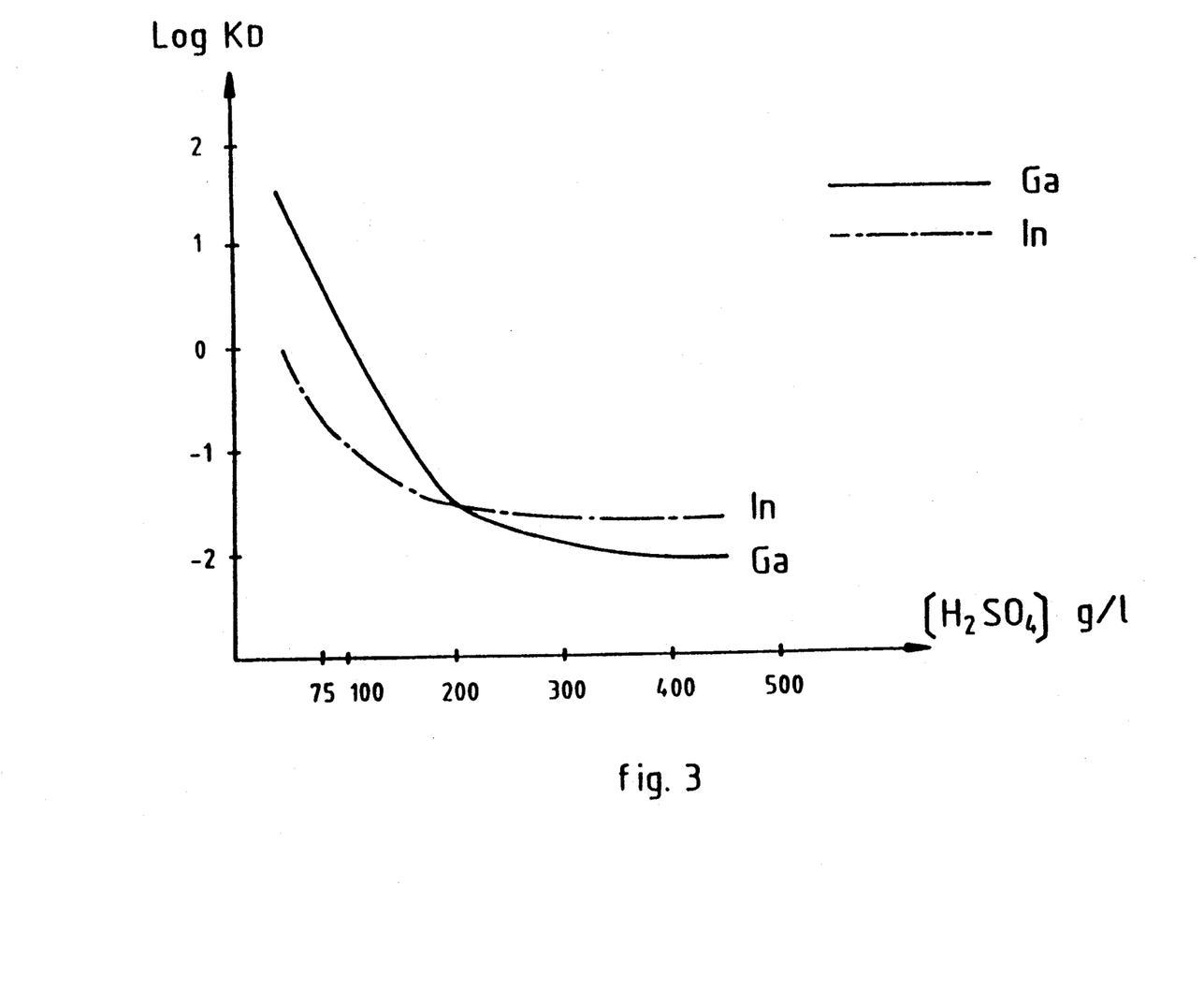

The before-mentioned and hereafter claimed elution conditions are based on these results, in sofar as they relate to $H_2SO_4$ solutions. These results make it clear, among others, that In can be selectively eluted with respect to Ga from the loaded organic phase. Indeed, at an equilibrium concentration of ±75 g/l $H_2SO_4$, the log $K_DGa$ and log $K_DIn$ amount to respectively +0.75 and −0.75, which corresponds to a Ga/In selectivity ($K_DGa/K_DIn$) of ±30.

EXAMPLE 11

This example relates to the elution of In and Ga from an organic phase obtained by the process of the invention by means of HCl.

The organic phase has the same composition as the one of example 10.

In a first test one proceeds in the same way as in the first test of example 10, but instead of using a 50 g/l $H_2SO_4$ solution, an aqueous solution of 20.4 g/l HCl is used now.

This test is repeated with aqueous solutions of 51.1, 100.2 and 200.8 g/l HCl.

Figure 4:
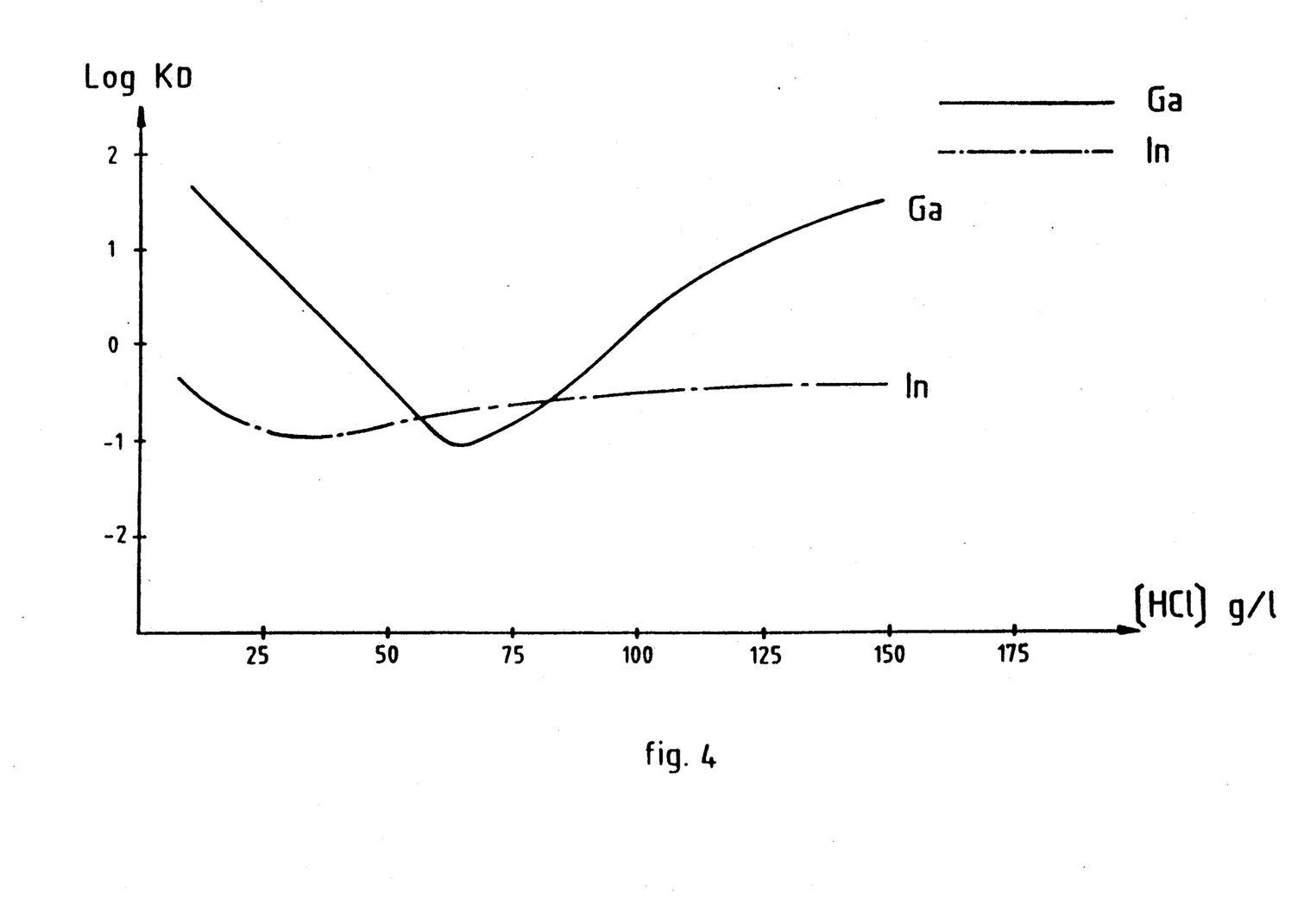

The results of these tests are represented grafically in the diagram of FIG. 4, with log $K_D$ on the ordinate and the acid concentration of the separated aqueous phase (in g/l) on the abscissa. The log $K_D$ of Ge is neither represented here on the diagram; it is markedly higher than 2 between 15 and 150 g/l HCl.

The before-mentioned and hereafter claimed elution conditions are based on these results, in sofar as they related to HCl solutions. The results show among others that In can be selectively eluted with respect to Ga, when operating at a sufficiently low equilibrium concentration of HCl (±15 g/l).

We claim:

1. A process for separating germanium from a germanium-bearing aqueous sulphate solution containing indium and/or gallium, which comprises contacting said solution with an organic phase containing a substituted 8-hydroxyquinoline and an organophosphorous compound having at least one phosphorus-bearing acid function having the formula wherein A represents an oxygen or a sulfur atom, the contacting being carried out at a pH of 0.5-2.5 when said solution contains indium or at a pH of 0.5-4 when said solution is indium-free, thereby transferring indium and/or gallium into the organic phase together with germanium.

2. A process according to claim 1 wherein the germanium-bearing aqueous sulphate solution contains, apart from water, zinc sulphate as its main constituent.

3. A process according to claim 2 wherein said sulphate solution is an intermediate or a by-product of an electrowinning of zinc process.

4. A process according to claim 1 wherein said substituted 8-hydroxyquinoline has the general formula wherein n ranged between 5 and 15.

5. A Process according to claim 4 wherein 7-(1-methyl-4-ethyl)-octyl-8-hydroxyquinoline is said substituted 8-hydroxyquinoline.

6. A process according to claim 1 wherein said organophosphorus compound has the general formula wherein
$R_1$ is an alkyl-, alkenyl-, aryl- or alkylaryl radical or an alicyclic radical with 1 to 20 carbon atoms,
$R_2$ is hydrogen or an alkyl-, alkenyl-, aryl, alkylaryl radical or an alicyclical radical with 1 to 20 carbon atoms, and
A and B can be identical or different and represent an oxygen or sulphur atom.

7. A process according to claim 6 wherein said organophosphorus compound is mono-(2-ethyl)-hexyl-(2-ethyl)-hexyl-phosphonic acid-ester.

8. A process according to claim 6 wherein (2-ethyl)-hexyl-benzyl-phosphonic acid is said organophosphorus compound.

9. A process according to claim 1 wherein the substituted 8-hydroxyquinoline and the organophosphorus compound are used in a volume ratio ranging from 1:10 to 10:1.

10. A process according to claim 9 wherein said ratio ranges from 1:2 to 2:1.

11. A process according to claim 1 wherein the organic phase is mainly an inert solvent.

12. A process according to claim 11 wherein the organic phase contains a compound which is able to prevent the formation of an emulsion.

13. A process according to claim 12 wherein said compound is isodecanol.

14. A process according to claim 1 wherein the organic phase has a solid carrier in the form of a resin or a porous membrane which carries the substituted 8-hydroxyquinoline and the organophosphorus compound.

15. A process according to claim 1 wherein said contacting is carried out at a temperature above 40° C.

16. A process according to claim 15 wherein the temperature is under 80° C.

17. A process according to claim 1 wherein said contacting is carried out at a pH of 1–2.5 in the presence of indium and gallium, at a pH of 1–2 in the absence of gallium, and at a pH of 1–4 in the absence of indium.

18. A process according to claim 17 wherein said contacting is carried out at a pH of 1–2 in the presence of indium and gallium, at a pH of 1.2–1.7 in the absence of gallium, and at a pH of 1–2.5 in the absence of indium.

19. A process according to claim 18 wherein said contacting is carried out at a pH of 1.5–1.7 in the presence of indium and gallium and at a pH of 1.5–2 in the absence of indium.

20. A process according to claim 1 wherein germanium is recovered from the organic phase by bringing the latter into contact with a NaOH solution.

21. A process according to claim 20 wherein indium is recovered from the organic phase by bringing the latter into contact with a solution selected from the group consisting of (a) a $H_2SO_4$ solution with more than 50 g/l $H_2SO_4$ and (b) a HCl solution with 10–100 g/l HCl.

22. A process according to claim 21 wherein indium is recovered from the organic phase by bringing the latter into contact with a solution selected from the group consisting of (a) a $H_2SO_4$ solution with more than 100 g/l $H_2SO_4$ and (b) with a HCl solution with 20–25 g/l HCl.

23. A process according to claim 20 wherein gallium is recovered from the organic phase by bringing the latter into contact either with a $H_2SO_4$ solution with more than 100 g/l $H_2SO_4$ or with a HCl solution with 40–100 g/l HCl.

24. A process according to claim 23 wherein gallium is recovered from the organic phase by bringing the latter into contact either with a $H_2SO_4$ solution with more than 150 g/l $H_2SO_4$ or with a HCl solution with 60–70 g/l HCl.

25. A process according to claim 20 wherein indium and gallium are recovered together from the organic phase by bringing the latter into contact either with a $H_2SO_4$ solution with more than 100 g/l $H_2SO_4$ or with a HCl solution with 40–700 g/l HCl.

26. A process according to claim 25 wherein said $H_2SO_4$ solution contains more than 150 g/l $H_2SO_4$.

* * * * *

UNITED STATES PATENT AND TRADEMARK OFFICE
CERTIFICATE OF CORRECTION

PATENT NO. : 5,277,882
DATED : January 11, 1994
INVENTOR(S) : Vliegen, et. al.

It is certified that error appears in the above-indentified patent and that said Letters Patent is hereby corrected as shown below:

Column 1, line 12 : "form" should read "from"

Column 1, line 56 : "used" should read "uses"

Column 2, line 34 : "contains" should read "containing"

Column 2, line 37 : "frequency" should read "frequently"

Column 3, line 53 : "membrane" should read "membranes"

Column 3, line 55 : "Membrane" should read "Membranes"

Column 5, line 2 in the first formula : "$(CH_2O_3$" should read "$(CH_2)_3$"

Column 5, line 32 in the second formula : "$(CH_2O_3$" should read "$(CH_2)_3$"

Column 6, line 4 : "$_{[In]}O$" should read "$[In]_O$"

Column 6, line 29 : "77" should read "7.7"

Column 8, line 30 : "$K_D=603$" should read "$K_D>603$"

Column 9, line 42 : "percentage" should read "percentages"

Column 10, line 7 : "liter;" should read "liter :"

Column 11, line 6 : "examples" should read "example"

Column 11, line 12 : "25ID" should read "25 % ID"

Column 13, claim 4, last line : "ranged" should read "ranges"

UNITED STATES PATENT AND TRADEMARK OFFICE
CERTIFICATE OF CORRECTION

PATENT NO. : 5,277,882
DATED : January 11, 1994
INVENTOR(S) : Vliegen, et. al.

It is certified that error appears in the above-indentified patent and that said Letters Patent is hereby corrected as shown below:

Column 14, Claim 25, last line : "700" should read "70"

Signed and Sealed this

Nineteenth Day of July, 1994

Attest:

BRUCE LEHMAN

Attesting Officer          Commissioner of Patents and Trademarks